United States Patent [19]

Burke

[11] Patent Number: 4,743,112

[45] Date of Patent: May 10, 1988

[54] IMAGING SPECTROMETER

[75] Inventor: Elliot M. Burke, Garfield, N.J.

[73] Assignee: Santa Barbara Research Center, Goleta, Calif.

[21] Appl. No.: 886,707

[22] Filed: Jul. 18, 1986

[51] Int. Cl.$^4$ .............................. G01J 3/36; G01J 3/14
[52] U.S. Cl. .................................... 356/326; 356/333; 350/286
[58] Field of Search ............... 356/302, 303, 308, 319, 356/326, 331, 332, 333; 350/286

[56] References Cited

U.S. PATENT DOCUMENTS 2,605,672 8/1952 Stamm .................................. 356/333
2,670,652 3/1954 Sherman ............................. 356/333

Primary Examiner—Vincent P. McGraw
Attorney, Agent, or Firm—W. C. Schubert; V. G. Laslo; A. W. Karambelas

[57] ABSTRACT

An imaging spectrometer device is disclosed useful for providing a dispersed image of the earth's surface (useful in botanical, geographical, geological, and hydrological scientific studies) from a flying platform. In accordance with this invention, a spectrometer device is provided which can be attached to an existing optical telescope. The spectrometer provides a planar focal plane image which can be processed in a number of manners, for example, by using an array of photosensitive elements. In accordance with the principal feature of this invention, the spectrometer includes an optical system wherein light rays are directed through prisms as they pass through the two symmetrical "legs" of the spectrometer. The spectrometer employs a reflecting concave mirror and prism assemblies having parallel entrance and exit surfaces. In accordance with a first embodiment, a single prism assembly is employed whereas the second described embodiment uses a pair of generally identical prism assemblies.

7 Claims, 2 Drawing Sheets

IMAGING SPECTROMETER

BACKGROUND OF THE INVENTION

This invention relates to an optical spectrometer device. The device is generally usable in the wide range of measurements where spectrometers are employed. Specific technical features make this instrument well suited to field measurements.

An inventory of earth resources can be effectively accomplished by spectrometer observations from an airplane or satellite. Information is obtainable since various substances, life forms and structures reflect and radiate energy at various wavelengths in characteristic fashions. Agronomists, botanists, geologists, hydrologists, and many others can extract valuable information from the images made from narrow wavelength bands.

In order to provide useful spectrally dispersed images of the earth's surface, an imaging spectrometer is flown aboard a high altitude platform such as a space shuttle, aircraft, or free-flying satellite. Information gathered by the imaging spectrometer can be stored internally for later retrieval or transmitted to an earth or satellite data receiving station.

Spectrometers function using the principle of dispersion of light which occurs as rays of light are deviated, typically by a diffraction grating or refracted through a prism. Diffraction gratings behave optically like a multiplicity of very narrow individual slits which cause light rays to be deviates in accordance with the wavelength of those rays. Prisms cause dispersion of light since the angle of deviation of a light ray as it passes through a prism is a function of its wavelength due to the fact that optical materials exhibit differing indexes of refraction dependent upon the wavelength of light passing therethrough. Spectrometer systems using prism dispersing elements have inherent advantages over those using diffraction grating-type dispersion elements since they are more efficient in terms of light transmission and less troubled by stray light. Accordingly, many current designs of imaging spectrometers employ prism-type dispersion elements. Imaging spectrometers intended for field use employ a fore-optics section which images a portion of the earth's surface onto a slit to define the field-of-view. Light transmitted through (or reflected from) the slit is then dispersed using a diffraction grating or prism. The dispersed light is imaged on a focal plane, which would typically be comprised of an array of minute photosensitive elements. As the spectrometer platform traverses the earth's surface, a swath of the earth's surface is imaged. The information gathered by the spectrometer can be later processed to produce images of the areas studied which indicate the emission and/or reflection of various wavelengths of light from various points on the earth's surface.

A number of designs for imaging spectrometer devices are currently known. These devices typically have a fore-optics section which produces an image of a selected portion of the earth's surface, a slit, and a spectrometer portion which disperses the slit image. These devices, however, tend to be bulky and are essentially single-purpose instruments, i.e., imaging spectrometers. Further, these systems typically require a non-planar focal plane assembly which significantly complicates fabrication of the focal plane with its array of detectors. Moreover, currently envisioned imaging spectrometers require that the fore-optic systems include a collimator to make all the light rays parallel. Collimation is necessary to control aberrations which result when non-collimated light is transmitted through the prism dispersing element. Current imaging spectrometers further are relatively bulky instruments since the optical ray path lengths tend to be fairly long.

SUMMARY OF THE INVENTION

The present invention relates to an improved imaging spectrometer which provides a number of advantages over current spectrometer designs. In accordance with this invention, a novel prism design is described which provides excellent optical performance without requiring light collimation, therefore simplifying the fore-optics system. Due to this advantage, the imaging spectrometer according to this invention can be "bolted on" to existing design optical telescopes which do not have light collimators. Since the spectrometer according to this invention may be used with existing fore-optics systems, its cost is considerably reduced as compared with dedicated spectrometer-only systems. The vesatility of the entire system is enhanced since the fore-optics telescope portion can be used for other purposes when not functioning for spectrometer imaging. The spectrometer system according to this invention further provides a flat field, thereby enabling the use of planar shaped focal plane assemblies thereby reducing cost and complexity of the focal plane. The present spectrometer is very compact since the desired field size at the focal plane can be achieved without a long optical axis length. The spectrometer according to this invention provides excellent image quality to the use of a "double armed" optical system wherein the light rays are passed through prism elements in both arms of the unit.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings in which:

DETAILED DESCRIPTION OF THE INVENTION

Figure 1:
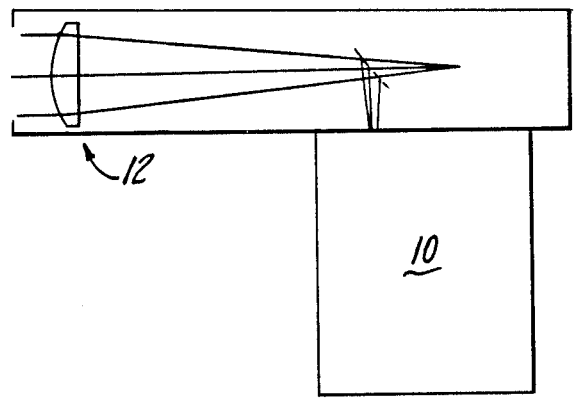
FIG. 1 is a diagrammatic representation of an illustrative telescope system coupled to an imaging spectrometer in accordance with this invention.

With particular reference to FIG. 1 herein, imaging spectrometer 10 in accordance with this invention is shown connected to an exemplary optical telescope 12. Telescope 12 receives an image and, through optical elements, converges this image in magnified form to an exit pupil. Imaging spectrometer 10 can be coupled to telescope 12 as shown in FIG. 1 to enable spectral analysis of the telescope's image.

Figure 2:
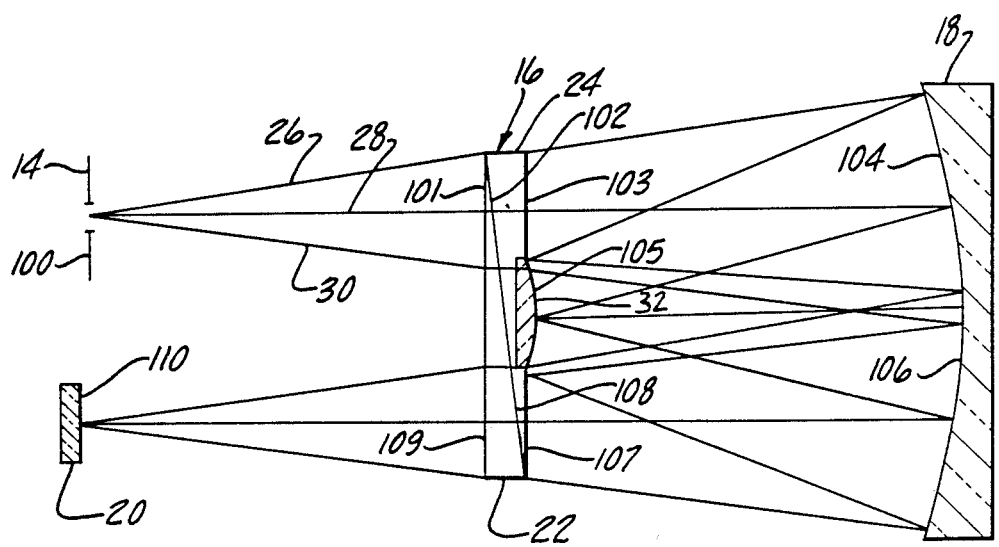
FIG. 2 is a diagrammatic representation of a first embodiment of an imaging spectrometer in accordance with this invention using a single large prism assembly.

FIG. 2 illustrates diagrammatically an imaging spectrometer 10 in accordance with a first embodiment of this invention. Imaging spectrometer 10 generally comprises optical slit 14, prism assembly 16, concave reflecting mirror 18, and focal plane assembly 20. Optical slit 14 and focal plane 20 are generally arranged along the same plane with reflecting mirror 18 displaced therefrom. Prism assembly 16 is placed between the plane of optical slit 14 and focal plane 20, and reflecting mirror 18. As shown in FIG. 2, light designated by rays 26 and 30 and optical axis 28, which is transmitted through optical slit 14, first passes through prism assembly 16 where some dispersion occurs due to variations in the deviation of light as a function of light frequency. The light is then transmitted to reflecting mirror 18 where it is reflected to a convex secondary mirror 32, where it again is directed toward reflecting mirror 18. The rays are then redirected through prism assembly 16 and pass therethrough in an opposite direction where the dispersion of light is increased. The light is finally directed onto focal plane 20 which preferably has an array of minute photosensitive elements.

Prism assembly 16 is comprised of a pair of wedge-shaped prism elements 22 and 24. In accordance with a principal feature of this invention, prism elements 22 and 24 have outside surfaces 101 and 103 which are parallel. Surfaces 101 and 103 are the light ray entrance and exit surfaces of prism assembly 16. It has been found that arranging surfaces 101 and 103 so that they are parallel tends to reduce the image distorting effect of aberrations which would otherwise result when non-collimated light strikes the prism surfaces. Further, the entrance and exit surfaces of prism assembly 16 are oriented perpendicular to optical axis 28, which also contributes to reducing aberrations. In accordance with this embodiment, prisms 22 and 24 are chosen such that their index of refraction is essentially the same at some nominal wavelength within the desired spectral band of the instrument, such that light at this wavelength is not deviated by prism assembly 16. However, the optical materials of prism elements 22 and 24 are selected to vary widely in dispersion at wavelengths other than the nominal to thereby produce a dispersed image. Since spectrometer 10 has two "arms" causing th light transmitted to the spectrometer to pass through prism assembly 16 twice, dispersion is increased, as is spectral resolution (resolving narrow wavelength bands), yet provides compactness of spectrometer 10. Further, the two arms of the system enable certain aberrations caused by the first pass through prisms assembly 16 to be cancelled after the second pass through the prism assembly occurs. Scaling of the optical system can be used to achieve the desired field size at focal plane 20.

Since the path lengths of light ray paths 26 and 30 and the ray along optical axis 28 have the same length, the image formed at focal plane 20 is planer, thereby providing a flat field which simplifies focal plane fabrication. This is a significant advantage since nonplanar focal planes are difficult to construct since the array of photosensitive elements must be precisely positioned to define a curved surface.

The specific optical parameters for an example of an imaging spectrometer 10 built in accordance with the first embodiment of this invention is provided in Table 1 below. Table 1 identifies the optical surfaces and elements of spectrometer 10 which are consecutively numbered in the order in which light rays 26 and 30 and the ray along optical axis 28 strike the various surfaces, starting with surface 100 which corresponds to optical slit 14. Surfaces 101, 102, and 103 are the surfaces which the rays contact as they pass through the first "leg" of the spectrometer, whereas surfaces 104, 106, and 105 are reflective surfaces of concave reflecting mirror 18 and convex secondary mirror 32. Surfaces 107, 108, and 109 are surfaces of prism assembly 16 which the rays interact with as they pass through the second "leg" of spectrometer 10 before they are finally directed onto surface 110 which corresponds to focal plane 20. The various parameters identified in the tables are standard parameters used in the computer software package called ACCOSV sold by Optical Research Associates, Inc., 550 N. Rosemead Boulevard, Pasadena, Calif. 91107, the documentation of which is hereby incorporated by reference.

TABLE 1

BASIC LENS DATA

| SURFACE NUMBER | CURVATURE | RADIUS | THICKNESS | MEDIUM |
| --- | --- | --- | --- | --- |
| 100 | 0.000000 | 0.000000 | 94.000000 | AIR |
| 101 | 0.000278 | 3593.109902 | 5.000000 | SCHOTT T1F6 |
| 102 | 0.000000 | 0.000000 | 5.000000 | SCHOTT PSK53 |
| 103 | 0.000000 | 0.000000 | 100.000000 | AIR |
| 104 | −0.004991 | −200.355447 | −99.632397 | REFLECTIVE |
| 105 | −0.010000 | −100.000000 | 99.632397 | REFLECTIVE |
| 106 | −0.004991 | −200.355447 | −100.000000 | REFLECTIVE |
| 107 | 0.000000 | 0.000000 | −5.000000 | SCHOTT PSK53 |
| 108 | 0.000000 | 0.000000 | −5.000000 | SCHOTT T1F6 |
| 109 | 0.000278 | 3593.109902 | −92.725147 | AIR |
| 110 | 0.000000 | 0.000000 | 0.000000 | AIR |

CONIC CONSTANT AND ASPHERIC DATA

| SURFACE NUMBER | CONIC CONSTANT |
| --- | --- |
| 105 | 2.54511E-02 |

TILT AND DECENTER DATA

| SURFACE NUMBER | TYPE | YD | XD | ALPHA | BETA | GAMMA |
| --- | --- | --- | --- | --- | --- | --- |
| 102 | Tilt | 0.00000 | 0.00000 | 10.0000 | 0.0000 | 0.0000 |
| 103 | Tilt | 0.00000 | 0.00000 | −10.0000 | 0.0000 | 0.0000 |
| 108 | Tilt | 0.00000 | 0.00000 | 10.0000 | 0.0000 | 0.0000 |
| 109 | Tilt | 0.00000 | 0.00000 | −10.0000 | 0.0000 | 0.0000 |

| REFERENCE OBJECT HEIGHT | REFERENCE APERTURE HEIGHT | OBJECTIVE SURFACE | REFERENCE SURFACE | IMAGE SURFACE |
| --- | --- | --- | --- | --- |

TABLE 1-continued

| 0.250000E+02 (−14.89 DG) | 13.17897 | 100 | 105 | 110 |
|---|---|---|---|---|

| EFFECTIVE FOCAL LENGTH | BACK FOCUS | F/NBR | LENGTH | OID | TRANSVERSE MAGNIFICATION |
|---|---|---|---|---|---|
| 4217.4383 | −92.7251 | −3.76 | 110.0000 | 1.2749 | 1.000146 |
| WAVL NBR | 1 | 2 | 3 | 4 | 5 |
| WAVELENGTH | 0.58756 | 0.48613 | 0.65627 | 0.43584 | 0.70652 |
| SPECTRAL WT | 1.0000 | 1.0000 | 1.0000 | 1.0000 | 1.0000 |

APERTURE STOP AT SURF 105
ALL LENS UNITS ARE MILIMETERS

Figure 3:
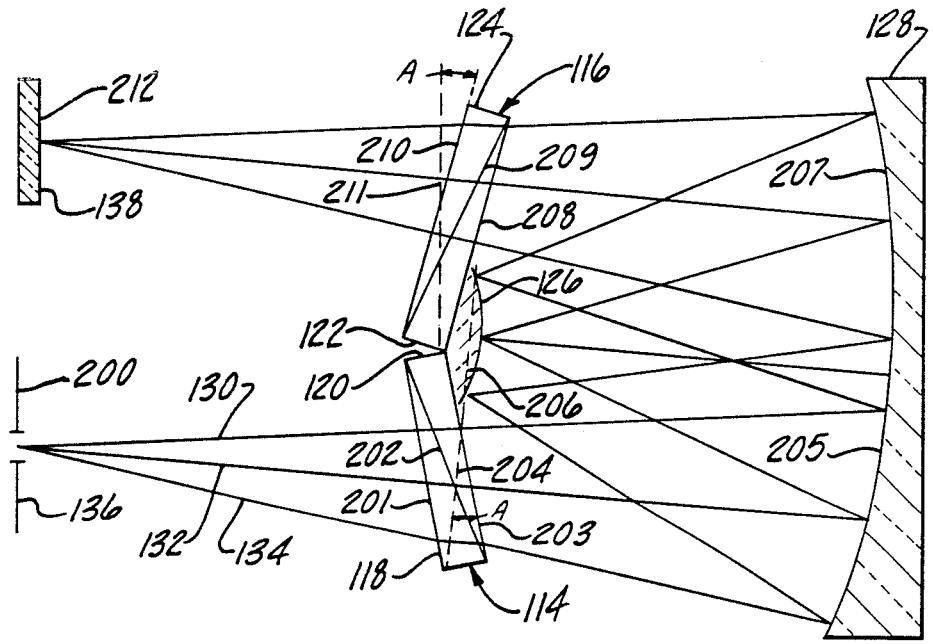
FIG. 3 is a diagrammatic representation of an imaging spectrometer in accordance with a second embodiment of this invention utilizing a pair of prism assemblies.

Spectrometer 113 in accordance with a second embodiment of this invention is shown in FIG. 3. Spectrometer 113 shown in FIG. 3 is depicted with an upper "leg" which includes the focal plane wherein the upper leg shown in FIG. 2 includes the optical slit. Spectrometer 113 is adapted for similar applications as spectrometer 10. Spectrometer 113 includes a pair of prism assemblies 114 and 116, each comprised of a pair of prism elements 118, 120, 122, and 124, respectively. Convex secondary mirror 126 is provided to reflect the image from concave mirror 128. Ray paths 130 and 134 and rays along the optical axis 132 are directed through spectrometer 113 in a manner like that of spectrometer 10, i.e. through slit 136 and prism assembly 114, and reflected from mirrors 126 and 128. The rays are then transmitted through another prism assembly 116 (instead of through the same prism according to the first embodiment) and onto focal plane 138. Like the first embodiment, both prism assemblies 114 and 116 feature entrance and exit surfaces which are parallel, which has been found to control aberrations without requiring light collimators. However, unlike the first embodiment, the entrance and exit surfaces of prism assemblies 114 and 116 are not oriented normal to central ray path 132. In accordance wih this embodiment, it has been found that entrance and exit surfaces of assemblies 114 and 116 may be tilted from a plane normal to central ray path 132. However, it has been found that the angle of tilt, identified by angle A in FIG. 3, must be identical for both prism assemblies but in opposite directions to cancel aberrations resulting since the rays do not strike the prism assemblies normal to their surface. Prism assemblies 114 and 116 are comprised to prism elements having different characteristic indexes of refraction to thereby disperse the slit image passing therethrough. In other respects, their embodiment operates like the first and similarly enables the use of a planar shaped focal plane 138. The specific optical parameters which have been found acceptable for spectrometer 113 in accordance with the second embodiment of this invention are provided as Table 2. Like Table 1, optical surfaces are numbered consecutively in accordance with the succession of surfaces acting upon light rays 130, 132, and 134 as they are transmitted from slit 136, designated by reference number 200, through surfaces 201, 202, and 203 of prism assembly 114 and reflected from surfaces 205, 206, and 207. Thereafter, rays are directed across surfaces 208, 209, and 210 of prism element 116, and finally onto focal plane surface 212. Surfaces 204 and 211 identified in FIG. 3 and in Table 2 are "dummy" surfaces which provide convenient datums from which other surfaces are defined.

TABLE 2

| BASIC LENS DATA | | | | |
|---|---|---|---|---|
| SURFACE NUMBER | CURVATURE | RADIUS | THICKNESS | MEDIUM |
| 200 | 0.000000 | 0.000000 | 94.000000 | AIR |
| 201 | 0.000373 | 2682.989828 | 5.000000 | SCHOTT FK52 |
| 202 | 0.000000 | 0.000000 | 5.000000 | SCHOTT KZF52 |
| 203 | 0.000000 | 0.000000 | 0.000000 | AIR |
| 204 | 0.000000 | 0.000000 | 100.000000 | AIR |
| 205 | −0.004990 | −200.382767 | −99.101621 | REFLECTIVE |
| 206 | −0.010000 | −100.000000 | 99.101621 | REFLECTIVE |
| 207 | −0.004990 | −200.382767 | −100.000000 | REFLECTIVE |
| 208 | 0.000000 | 0.000000 | −5.000000 | SCHOTT FK52 |
| 209 | 0.000000 | 0.000000 | −5.000000 | SCHOTT KZF52 |
| 210 | 0.000373 | 2682.989828 | 0.000000 | AIR |
| 211 | 0.000000 | 0.000000 | −92.760774 | AIR |
| 212 | 0.000000 | 0.000000 | 0.000000 | AIR |

| CONIC CONSTANT AND ASPHERIC DATA | |
|---|---|
| SURFACE NUMBER | CONIC CONSTANT |
| 206 | 2.54511E-02 |

| TILT AND DEC DATA | | | | | | |
|---|---|---|---|---|---|---|
| SURFACE NUMBER | TYPE | YD | XD | ALPHA | BETA | GAMMA |
| 201 | Tilt | 0.00000 | 0.00000 | 10.6205 | 0.0000 | 0.0000 |
| 202 | Tilt | 0.00000 | 0.00000 | 10.0000 | 0.0000 | 0.0000 |
| 203 | Tilt | 0.00000 | 0.00000 | −8.7515 | 0.0000 | 0.0000 |
| 204 | Tilt | 0.00000 | 0.00000 | −16.1350 | 0.0000 | 0.0000 |
| 205 | Dec | 25.00000 | 0.00000 | | | |
| 208 | Tilt | 25.00000 | 0.00000 | −10.6205 | 0.0000 | 0.0000 |
| 209 | Tilt | 0.00000 | 0.00000 | −10.0000 | 0.0000 | 0.0000 |
| 210 | Tilt | 0.00000 | 0.00000 | 8.7515 | 0.0000 | 0.0000 |
| 211 | Tilt | 0.00000 | 0.00000 | 16.1350 | 0.0000 | 0.0000 |

| REFERENCE OBJECT HEIGHT | REFERENCE APERTURE HEIGHT | OBJECT SURFACE | REFERENCE SURFACE | IMAGE SURFACE |
|---|---|---|---|---|

TABLE 2-continued

| | | | | | |
|---|---|---|---|---|---|
| 0.250000E+02 (−14.89 DG) | 13.23653 | | 200 | 206 | 212 |
| EFFECTIVE FOCAL LENGTH | BACK FOCUS | F/NBR | LENGTH | OID | TRANSVERSE MAGNIFICATION |
| 5424.9519 | −92.7608 | −3.75 | 110.0000 | 1.2392 | 0.997319 |
| WAVL NBR | 1 | 2 | 3 | 4 | 5 |
| WAVELENGTH | 0.40000 | 0.50000 | 0.60000 | 0.70000 | 0.90000 |
| SPECTRAL WT | 1.0000 | 1.0000 | 1.0000 | 1.0000 | 1.0000 |

APERTURE STOP AT SURF 206
LENS UNIT ARE MILIMETERS

While the above description constitutes the preferred embodiments of the present invention, it will be appreciated that the invention is susceptible to modification, variation and change without departing from the proper scope and fair meaning of the accompanying claims.

What is claimed is:

1. An imaging spectrometer adapted to receive an image from an optical slit and spectrally disperse said image comprising:
   a concave reflective first mirror spaced from said slit,
   a focal plane assembly,
   a prism assembly including a pair of prism elements, said prism elements assembled such that they define first and second parallel surfaces, and
   a second mirror whereby light rays from said slit pass through said first and second prism surfaces and are spectrally dispersed, said dispersed rays being reflected from said first mirror, to said second mirror, and again from said first mirror, such that said dispersed rays again pass through said first and second prism surfaces where said dispersion is increased and said rays are then directed onto said focal plane.

2. The imaging spectrometer according to claim 1 wherein said first and second prism assembly surfaces are perpendicular to the optical axis of said spectrometer.

3. The imaging spectrometer according to claim 1 wherein said prism elements are formed from optical materials having the same index of refraction at some predetermined wavelength within the spectral band of said imaging spectrometer such that light at said wavelength is not deviated by said prism assembly, said prism differing in their indexes of refraction at wavelength other than said predetermined wavelength, thereby deviating said light at said other wavelengths.

4. The imaging spectrometer according to claim 1 wherein said slit, prism assembly, first and second mirrors are configured and positioned such that all ray paths are equidistant when said focal plane is planar in shape.

5. An imaging spectrometer adapted to receive an image from an optical slit and spectrally disperse said image comprising:
   a concave reflective first mirror spaced from said slit,
   a focal plane assembly,
   a first prism assembly having first and second parallel surfaces, said first prism assembly including a pair of prism elements,
   a second prism assembly having first and second parallel surfaces, said second prism assembly including a pair of prism elements, and
   a convex second mirror whereby light rays from said slit pass through said first prism assembly, first and second surfaces, and are spectrally dispersed, said dispersed rays being deflected from said first mirror, to said second mirror, and again from said first mirror, such that said dispersed rays pass through said second prism assembly first and second surfaces where said dispersion is increased and said rays are then directed onto said focal plane.

6. The imaging spectrometer according to claim 5 wherein said first and second prism assemblies are tipped with respect to the optical axis of said spectrometer, said first and second prism assemblies being tipped at the same angle.

7. The imaging spectrometer according to claim 5 wherein said slit, prism assembly, first and second mirrors are configured and positioned such that all ray paths are equidistant when said focal plane is planar in shape.

* * * * *